(12) United States Patent
Huang

(10) Patent No.: US 8,197,747 B2
(45) Date of Patent: Jun. 12, 2012

(54) LOW-MELTING BORON-FREE BRAZE ALLOY COMPOSITIONS

(76) Inventor: Xiao Huang, Ottawa (CA)

(*) Notice: Subject to any disclaimer, the term of this patent is extended or adjusted under 35 U.S.C. 154(b) by 657 days.

(21) Appl. No.: 12/192,270

(22) Filed: Aug. 15, 2008

(65) Prior Publication Data

US 2010/0038412 A1    Feb. 18, 2010

(51) Int. Cl.
 *C22C 19/05* (2006.01)
 *B23K 1/19* (2006.01)
(52) U.S. Cl. .................... 420/442; 228/262.9
(58) Field of Classification Search .......... 420/442; 228/262.9
 See application file for complete search history.

(56) References Cited

U.S. PATENT DOCUMENTS

| | | | |
|---|---|---|---|
| 4,073,639 A | 2/1978 | Duvall et al. | |
| 4,381,944 A | 5/1983 | Smith, Jr. | |
| 4,830,934 A | 5/1989 | Ferrigno et al. | |
| 5,240,491 A | 8/1993 | Budinger et al. | |
| 5,735,448 A | 4/1998 | Draghi et al. | |
| 5,783,318 A | 7/1998 | Biondo et al. | |
| 6,190,467 B1 | 2/2001 | Jackson et al. | |
| 6,257,882 B1 | 7/2001 | Wyllie, II | |
| 6,520,401 B1 | 2/2003 | Miglietti | |
| 6,982,123 B2 | 1/2006 | Budinger et al. | |
| 7,156,280 B1 | 1/2007 | Jiang et al. | |
| 7,261,758 B2 | 8/2007 | Okada et al. | |
| 7,279,229 B2 * | 10/2007 | Budinger et al. | 428/557 |
| 7,326,892 B1 * | 2/2008 | Cretegny et al. | 219/679 |
| 7,651,023 B2 | 1/2010 | Huang et al. | |
| 2003/0002988 A1 | 1/2003 | Jackson et al. | |
| 2004/0184945 A1 | 9/2004 | Sjodin et al. | |
| 2005/0067061 A1 | 3/2005 | Huang et al. | |
| 2006/0068214 A1 | 3/2006 | Gigliotti et al. | |

OTHER PUBLICATIONS

Zheng, et al. Acta Met. Sinica, vol. 3, No. 5, 1990 335-340) (6 pages).
B. Laux, S. Piegert and J. Rosler, TurboExpo 2008: Power for Land, Sea and Air, Jun. 9-13, 2008, Berlin, Germany, paper No. GT2008-50055 (9 pages).
Zheng, et al. Journal of Materials Science, 28 (1993) 823-829 (7 pages).
Humm and Lugscheide, Proceedings from Joining of Advanced and Specialty Materials, Nov. 5-8, 2001, Indianapolis, IN, ACM International, 2002 (5 pages).

* cited by examiner

*Primary Examiner* — Jessee R. Roe
(74) *Attorney, Agent, or Firm* — Adrian D. Battison; Ade & Company Inc

(57) ABSTRACT

Nickel-based low-melting boron-free braze alloy compositions include varying amounts of the alloying elements cobalt, chromium, hafnium, zirconium together with optionally titanium and aluminum. The braze alloys can be used as a stand alone braze alloy or in combination with other filler alloys to create braze joints with desirable joint geometries and properties. The braze alloy compositions can be used to join and repair different superalloy articles such as gas turbine components for high temperature applications.

17 Claims, 3 Drawing Sheets

LOW-MELTING BORON-FREE BRAZE ALLOY COMPOSITIONS

This invention relates to a nickel-based braze alloy composition which is substantially Boron free.

BACKGROUND OF THE INVENTION

Joining or repair of superalloy articles for high temperature applications can be achieved using welding or brazing. For superalloys containing substantial amounts of gamma prime or gamma double prime, welding can cause excessive cracking in the heat affected zone and fusion zone in addition to distortion of the article. Brazing, on the other hand, has advantages over welding in terms of capability in joining hard-to-weld superalloy articles and in reducing cost due to its suitable nature for batch processing. During a brazing cycle, the braze alloy melts, joins the superalloys, and solidifies either during cooling or isothermally via diffusion process. The superalloy articles to be joined must normally remain in solid state during brazing, and as such the braze alloys must have a much lower solidus (melting temperature) than the superalloys.

The following US Patents and Patent applications are related to this subject:

| | | |
|---|---|---|
| 4,073,639 | February 1978 | Duvall, et al. |
| 4,381,944 | May, 1983 | Smith, Jr.,. |
| 4,830,934 | May 1989 | Ferrigno, et al. |
| 5,240,491 | August 1993 | Budinger et al. |
| 5,735,448 | April 1998 | Draghi et al. |
| 5,783,318 | July 1998 | Biondo et al. |
| 6,520,401 | February 2003 | Miglietti |
| 6,190,467 | Feb. 20, 2001 | Jackson et al. |
| 6,982,123 | January 2006 | Budinger, et al. |
| 7,156,280 | January 2007 | Jiang et al. |
| 7,261,758 | August 2007 | Okada, et al. |
| 7,279,229 | October 2007 | Budinger, et al. |
| 2003/0002988 | January 2003 | Jackson, et al. |
| 2004/0184945 | September 2004 | Sjodin, et al. |
| 2005/0067061 | March 2005 | Huang, et al. |
| 2006/0068214 | March 2006 | Gigliotti, et al. |

Traditional nickel-based braze alloys contain relatively high amounts of boron and silicon (and phosphorus) in order to reduce the melting temperature of a nickel or nickel-chromium matrix down to suitable brazing temperatures of between 1000 degree C. to 1250 degree C. (America Welding Society (AWS): Brazing Handbook, $4^{th}$ ed., 1991). Furthermore, these elements are responsible for the wetting and flow behaviors of the braze alloys on the superalloy substrates. The use of boron or/and silicon as melting depressants in low melting braze alloys with or without the addition of high-melting filler alloy and related processes are described in U.S. Pat. Nos. 4,073,639; 4,381,944; 4,830,934; 5,735,448; 6,982,123; 7,261,758 and 7,279,229 listed above.

Boron, due to its high diffusivity, is preferred where homogeneous joint compositions are required. However, a costly diffusion process is needed in order to improve the mechanical integrity of the brazed joint/repaired area as boron forms brittle hard phases with other alloying elements within the joint/repaired area, reducing the ductility, fatigue life and corrosion resistance of the joint/repaired area. In addition to the cost associated with such diffusion heat treatments, prolonged heat treatments can also compromise the properties of the superalloy articles as a result of microstructural changes.

As such, the search for alternative melting point depressants while ensuring adequate ductility is needed. The use of hafnium as a melting point depressant for nickel based braze alloys represents a new approach to producing ductile braze alloys with moderate brazing temperatures below 1240 degree C.

U.S. Pat. No. 7,156,280 listed above uses hafnium as a melting point depressant to reduce the total amount of boron in the braze alloy. However, in that disclosure boron is also included in the braze alloy compositions claimed.

Ductile braze alloys containing nickel-hafnium-chromium, nickel-hafnium-cobalt and nickel-hafnium-molybdenum were proposed by Buschke and Lugscheider (Proceedings from Materials Conference '98 on Joining of Advanced and Specialty Materials, 12-15 Oct. 1998, Illinois) as an alternative braze alloy to boron and silicon containing braze alloys. While these alloys show good ductility, they require both very high brazing temperatures (1235 degree C.) in order to produce good wetting as well as a long diffusion cycle to homogenize the joints. Additionally, joints with nickel-hafnium-chromium suffer from galvanic corrosion when tested in aqueous salt solution (Humm and Lugscheide, Proceedings from Joining of Advanced and Specialty Materials, 5-8 Nov. 2001, Indianapolis, Ind., ASM International, 2002).

An addition of other elements to the nickel-hafnium alloys was also reported. This alloy contains Ni, 18.6% cobalt by weight, 4.5% chromium by weight, 4.7% tungsten by weight, and 25.6% hafnium by weight (Zheng, et al. Acta Met. Sinica, Vol. 3, No. 5, 1990 335-340). The addition of tungsten in the alloy contributed to an increase in the melting temperature of the alloy. As such, this alloy also requires an elevated brazing temperature. Additionally, due to the amount of hafnium in the braze alloy, the joint composition greatly deviates from that of the superalloy articles.

Where hafnium is present in a low-weight percentage, it generally acts as a grain boundary strengthener, not as a melting point depressant. U.S. Pat. No. 5,783,318 listed above claims a nickel-based welding filler metal with addition of 0.03-2.5% hafnium by weight, 0.003-0.32% boron by weight, and 0.007-0.35% zirconium by weight. The addition of hafnium, boron and zirconium is required for grain boundary strengthening when repairing single crystal superalloy articles. However, the weight percentage of the addition of these elements is too low to depress the melting temperature of the welding filler alloy.

In addition to the use of hafnium as a melting point depressant, zirconium exhibits similar function. U.S. Pat. No. 6,190,467 listed above discloses braze alloys with zirconium and boron as primary melting point depressants. Another nickel-based alloy containing 10.4% cobalt by weight, 8.5% chromium by weight, 4.4% tungsten by weight, and 13.4% zirconium by weight requires an excessively high brazing temperature of 1270 degree C. to achieve good joints (Zheng, et al. Journal of Materials Science, 28 (1993) 823-829).

U.S. Pat. No. 6,520,401 listed above describes nickel based boron-free braze alloy containing either 26-34% hafnium by weight or 11-19% or 40-60% zirconium by weight. The intermetallic phases formed in the nickel-zirconium eutectic alloys are found to be softer than borides. However, the addition of hafnium or zirconium is excessive thus preventing the brazed joint from reaching compositions similar to a super-alloy substrate even with the addition of filler alloys. Additionally, in that invention with the addition of hafnium or zirconium alone in nickel, it states that the lowest achievable melting temperatures are 1190 and 1170 degree C., respectively. A brazing temperature range from 1230 degree C. to 1320 degree C. for up to 36 hours is required. As such, braze alloy systems containing either hafnium or zirconium or are not able to achieve melting temperatures approaching that of boron-containing braze alloys. It is therefore necessary to find other alloying elements which can be incorporated in the nickel-hafnium, nickel-zirconium and nickel-hafnium-zirconium alloy systems, and the content of hafnium needs to be reduced to enable a braze joint to approach the compositions of the superalloy articles.

A nickel based braze alloy with manganese addition was also reported for epitaxial brazing of single crystal superalloys (B. Laux, S. Piegert and J. Rosler, TurboExpo 2008: Power for Land, Sea and Air, Jun. 9-13, 2008, Berlin, Germany, paper number GT2008-50055). This alloy, however, contains excessive manganese ranging from 20% to 58% by weight. Manganese is normally considered an incidental element in superalloys, and most superalloy specifications call for control of manganese to be less than 1% by weight.

U.S. Pat. No. 5,240,491 listed above discloses a braze alloy mixture containing two or more alloy powder compositions, one of the which is high-melting filler alloy selected based on the superalloy articles to be repaired/joined, and another is a low-melting braze alloy containing boron or/and silicon as melting point depressant. A third powder, termed eutectic alloy (3.1-8.2% cobalt by weight, 6.8-38.5% chromium by weight, 0-12.6% aluminum by weight, 0-11.5% titanium by weight, 0-1.3% molybdenum by weight, 0-23.1% tantalum by weight, 0-2.4% tungsten by weight, 0-5.1% niobium by weight, 0-1% rhenium by weight, 0-0.4% hafnium by weight, and 0-0.6% yttrium by weight), is formulated based on eutectic compositions in the superalloys and is used to assist liquid flow characteristics and alloying of the mixture. The eutectic alloy may become substantially liquid during brazing at 1260 degree C. and is not used as low-melting braze alloy.

While a few boron-free braze alloys have been formulated to join and repair nickel based superalloy articles, the prior art lacks boron-free nickel-based braze alloy compositions composed of multiple melting point depressants, each in moderate amount, to reduce the melting temperature and diffusion time and to provide joints with identical compositions as the substrate superalloys using matching filler alloys.

SUMMARY OF THE INVENTION

Accordingly, it is one object of the present invention to provide a nickel based substantially boron free braze alloy composition for joining and repair of superalloy articles.

According to the invention there is provided a nickel-based braze alloy composition comprising: 5-15% hafnium by weight, 4-20% chromium by weight, 5-25% cobalt by weight, and 2-15% zirconium by weight and wherein the composition is substantially Boron free such that if any boron is present it is less than 0.5%.

The nickel-based braze alloy composition comprises: 5-15% hafnium by weight, and all sub-ranges therebetween; 4-20% chromium by weight, and all sub-ranges therebetween; 5-25% cobalt by weight, and all sub-ranges therebetween; 2-15% zirconium by weight, up to 8% titanium and all sub-ranges therebetween. In addition the composition may include 0-9% aluminum by weight, and all sub-ranges therebetween and with balance of nickel or nickel and one or more of molybdenum, tungsten, iron, niobium, and silicon in solid solution or as particulates.

The determination of the composition ranges is based on three primary requirements for developing suitable braze alloys. First the formulation of the braze alloy must have sufficient melting point depressing elements to ensure that the braze alloy has a melting temperature below the incipient melting temperature of common substrate superalloy articles. This requires substantial amount of hafnium, cobalt, zirconium and preferably titanium to be above the minimum weight percentages specified.

The example hereinafter shows that 7.5% hafnium by weight, 15% cobalt by weight and 10% zirconium by weight additions to a nickel base provide braze alloy with a solidus temperature of 1175° C. upon cooling. This solidus temperature can be further reduced by adjusting these three elements with or without addition of titanium accordingly.

Secondly, the braze alloy should provide adequate corrosion resistance and strength thus requiring the addition of chromium, and optionally titanium and aluminum, respectively. The range of chromium addition may be adjusted depending upon whether the substrate superalloy article is to be coated (requiring the chromium in the lower range); or whether the braze alloy is to be used in narrow gap where higher chromium weight percent is preferred; or whether the braze alloy is to be used in wide gap where the additive alloy may add additional chromium into the braze region. Thus a wide range of 5-20% by weight is specified for chromium.

Aluminum and titanium additions impart precipitation hardening to the nickel-based alloy. Depending on the strengthening needs and whether an additive alloy containing titanium and aluminum is to be added during brazing, these two elements can be either present in sufficiently amounts or completely removed. The inclusion of titanium also contributes to suppressing the melting temperature of the braze alloy as shown hereinafter where 5.8% titanium addition by weight and slight elevations in hafnium, cobalt and zirconium reduced the solidus to 1120° C.

Thirdly, all elements described are not to exceed maximum limits based on the need to achieve similar chemical compositions as that of the superalloy substrates during wide gap brazing. The maximum weight percentage of hafnium and zirconium (15%) are determined based on the need to achieve less than 2.5% weight percentages of hafnium and zirconium when one part of the braze alloy is combined with 5 parts of additive alloy in wide gap brazing. The maximum cobalt percentage is limited to 25% by weight to ensure the braze alloy is nickel-base in nature where the percentage of cobalt must remain less that the percentage of nickel by weight in the braze alloy. The maximum titanium percentage is limited to 10% by weight to ensure the workability of the braze alloy in manufacturing.

DETAILED DESCRIPTION OF THE INVENTION

Figure 1:
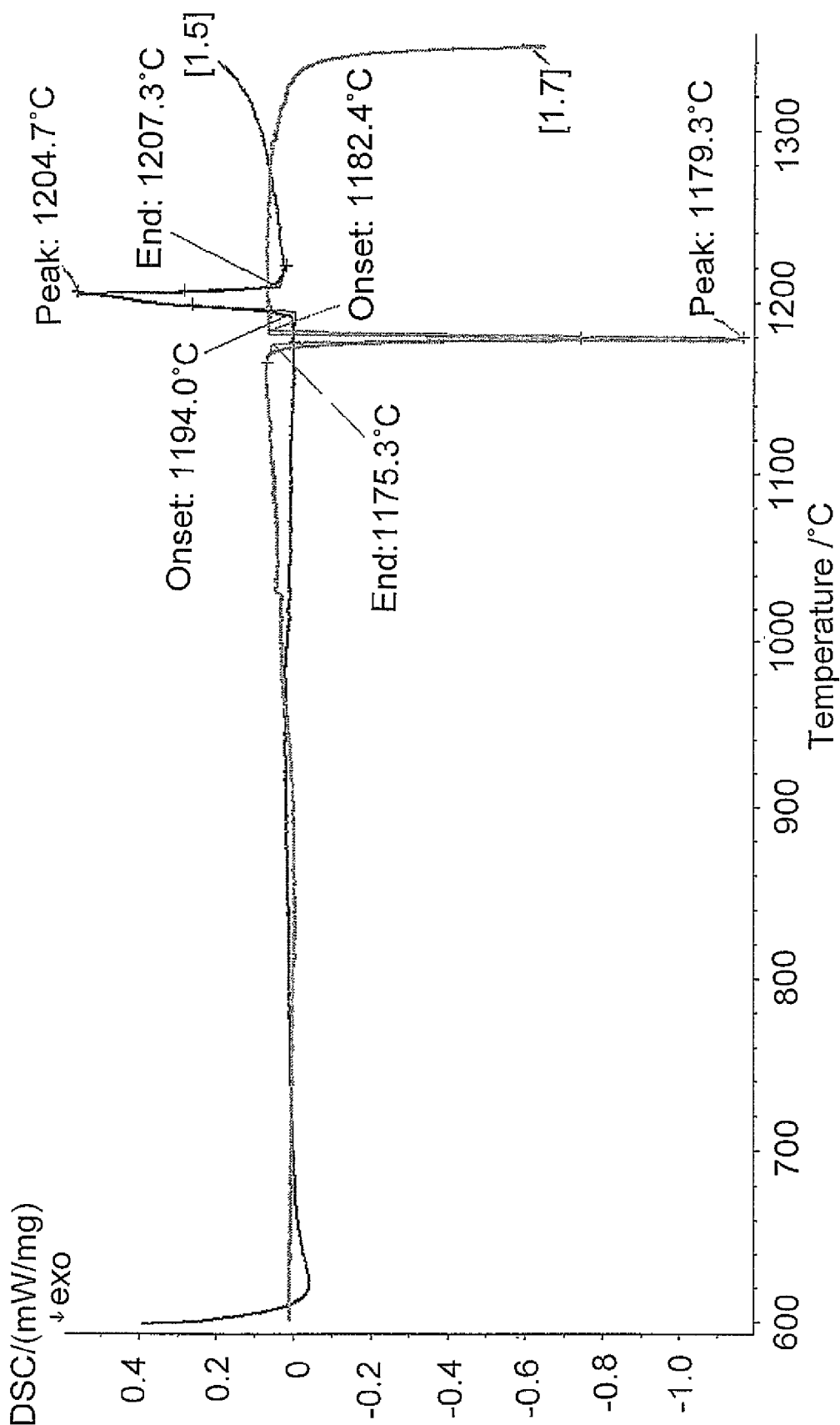
FIG. 1 is a graph showing the DSC (differential scanning calorimetry) heat flux curves illustrating the solidus and liquidus of an alloy with 7.5% hafnium by weight; 7.5% chromium by weight, 15% cobalt by weight, and 10% zirconium by weight during heating and cooling cycle (25 degree C. per minute).
Figure 2:
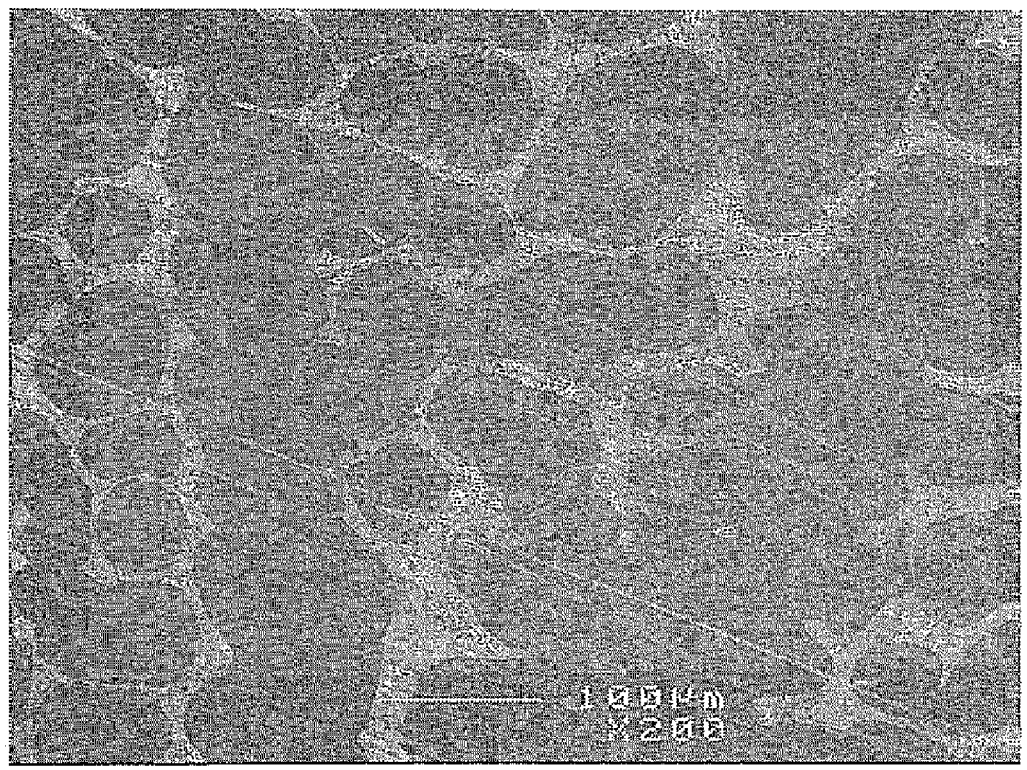
FIG. 2 is a photograph showing the Microstructure of a braze alloy with 7.5% hafnium by weight; 7.5% chromium by weight, 15% cobalt by weight, and 10% zirconium by weight.
Figure 3:
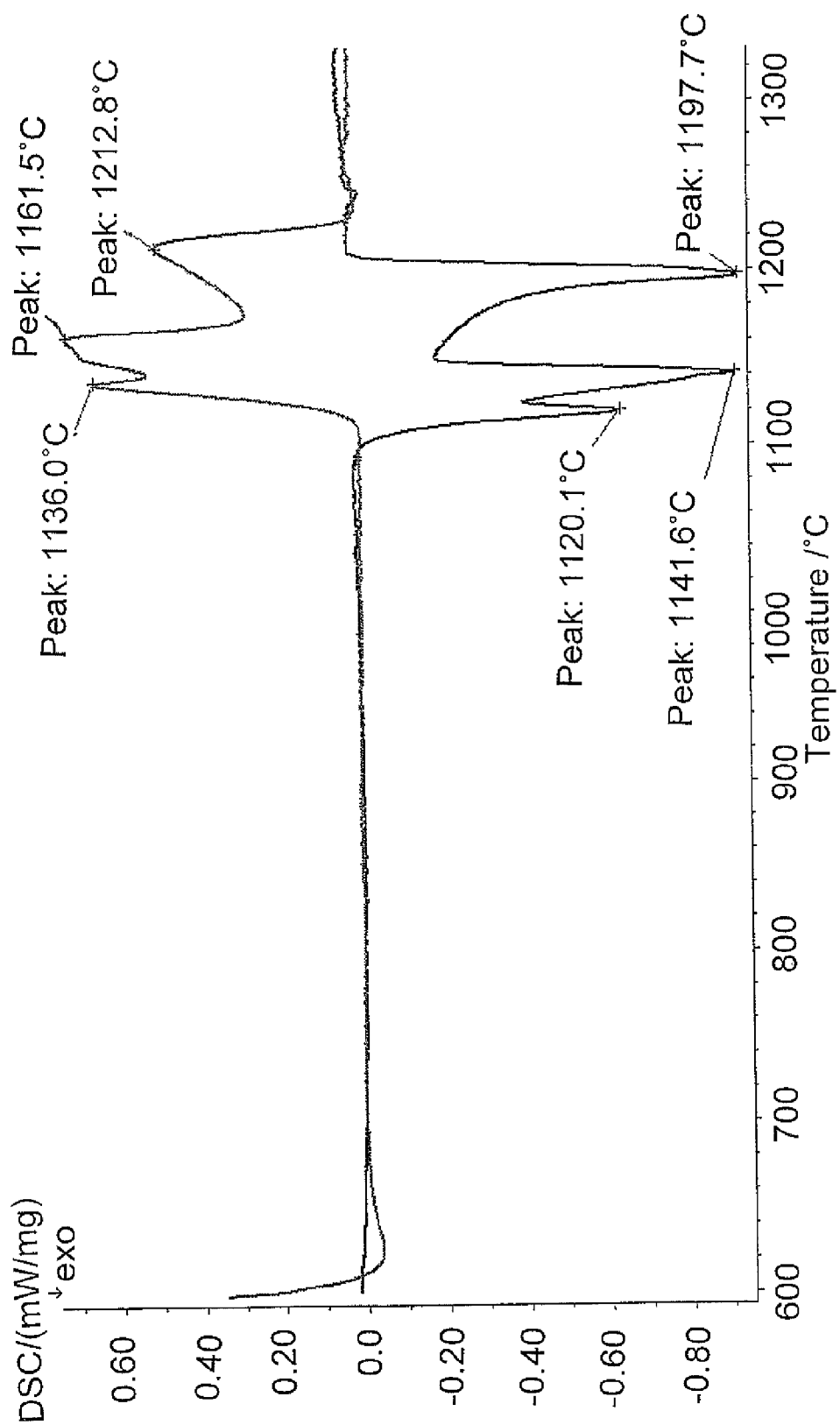
FIG. 3 is a graph showing the DSC heat flux curves illustrating the solidus and liquidus of the alloy with 9.1% hafnium by weight; 4.6% chromium by weight, 18.2% cobalt by weight, 9.1% zirconium by weight, 5.8% titanium by weight, and 3% aluminum by weight. (25 degree C. per minute).

In broad terms, alloying elements indigenous to known superalloy systems are used to formulate the braze alloy compositions included in this invention. Elements such as zirconium, hafnium, and titanium, which form low melting eutectic constituents, are intentionally used, in moderate quantities, to suppress melting temperatures of the boron-free braze alloy while at the same time reducing the diffusion time in homogenization treatment. In addition to providing melting point reduction to the nickel-based braze alloy, zirconium has been observed to improve the ductility and stress rupture life of the brazed joint. Hafnium, on the other hand, strengthens the gamma prime phase in precipitation hardened superalloys and improves the oxidation resistance and coatability of the brazed joints.

The amount of hafnium or zirconium addition in the braze alloy compositions is below that of the prior art. Furthermore, cobalt is found to suppress the solidus (temperature at which the alloy starts to melt) temperature and is added in the braze alloy compositions as well. In addition, chromium is included in the braze alloy compositions for environmental resistance, although the presence of chromium raises the solidus marginally.

Aluminum may be added to strengthen the braze joint by forming gamma prime phase with nickel. This is particularly important when a particular braze composition is used with the addition of high melting filler alloys for use in narrow gap or wide gap brazing. Elements such boron and manganese (two other melting point depressants) are excluded in this alloy as boron and manganese are commonly listed as trace elements in superalloys and can have detrimental effects on a superalloy's ductility, weldability and environmental resistance. However, incidental inclusion of these elements as impurities is not excluded in the compositions claimed.

The braze alloy compositions disclosed and claimed herein have a wide range of solidus and liquidus temperatures that can be modified to accommodate different superalloy operating temperatures. Due to the complete removal of brittle borides from the braze joint, the mechanical properties and environmental resistances of the joint with the braze alloy compositions claimed are expected to improve. The braze alloy compositions claimed in this invention may be used, in accordance with a first embodiment, as single component in narrow gap operation.

In this first embodiment the composition will include the following range of constituents: 5-15% hafnium by weight, 5-25% cobalt by weight, 2-15% zirconium by weight, 4-20% chromium by weight and up to 10% titanium by weight. A typical example would preferably contain 9% hafnium by weight, 18% cobalt by weight, 9% zirconium by weight and 15% chromium by weight and 5% titanium by weight.

Alternatively in accordance with a second embodiment, various braze alloy compositions may be used in admixture with other high melting filler alloys to form wide gap braze joint. These braze alloy compositions claimed in this invention can be used to join or repair superalloy articles with complex shapes and varying gap size, such as in gas turbine components.

In this second embodiment the composition will include the following range of constituents: 5-15% hafnium by weight, 5-25% cobalt by weight, 2-15% zirconium by weight, 4-20% chromium by weight and up to 10% titanium by weight. A typical example would preferably contain 12% hafnium by weight, 15% cobalt by weight, 12% zirconium by weight, 10% chromium by weight and 5% titanium by weight In accordance with a third embodiment of this invention, the formulation of the braze alloy compositions is such that the braze joint can be formed to have identical compositions as the substrate superalloys by selecting matching filler alloys since all elements included in the braze alloy compositions are present in common superalloy systems.

In this third embodiment the composition will include the following range of constituents: 5-15% hafnium by weight, 5-25% cobalt by weight, 2-15% zirconium by weight, 4-20% chromium by weight and up to 10% titanium by weight A typical example would preferably contain 15% hafnium by weight, 20% cobalt by weight, 15% zirconium by weight and 4% chromium by weight.

In accordance with one exemplary embodiment of the invention, a nickel-based braze alloy composition comprising: 5-15% hafnium by weight, 4-15% chromium by weight, 5-25% cobalt by weight, 2-10% zirconium by weight, 0-10% titanium by weight, and 0-5% aluminum by weight.

In accordance with another exemplary embodiment of the invention, the hafnium is preferably 5-10% by weight. More preferably, the hafnium is 7-10% by weight. The chromium is preferably 5-10% by weight. More preferably, the chromium is 5-7.5% by weight. The cobalt is preferably 7-20% by weight. More preferably, the cobalt is 10-20% by weight. The zirconium is preferably 5-10% by weight. More preferably, the zirconium is 8-10% by weight. The titanium is preferably 3-7% by weight. The aluminum is preferably 2-4% by weight.

In accordance with yet another exemplary embodiment of the invention, up to 50% of balance nickel content can be substituted by molybdenum, tungsten, iron, niobium, and silicon in solid solution or as particulate additions to improve mechanical and environmental resistance.

In accordance with still another exemplary embodiment of the invention, three nickel-based boron-free braze alloy compositions with varying amounts of alloying elements employed to modify the solidus temperatures as summarized in Table 1. Increasing hafnium, zirconium, cobalt, and titanium or reducing chromium, in general, reduces solidus. The alloying additions can be tailored according to service requirement.

TABLE 1

Effect of varying alloying weight percents on the solidus of the braze alloys

| Hf | Cr | Co | Zr | Ti | Al | Ni | Solidus (degree C.) |
|---|---|---|---|---|---|---|---|
| 7.5 | 7.5 | 15 | 10 | — | — | Bal. | 1175 |
| 10 | 5 | 20 | 10 | — | — | Bal. | 1151 |
| 9.1 | 4.6 | 18.2 | 9.1 | 5.8 | 3.3 | Bal. | 1120 |

A person of ordinary skill in the art will understand and recognize that all disclosed and claimed percentages are approximate. While the invention has been described in with reference to exemplary embodiment, it is to be understood that the invention is not to be limited to the disclosed embodiment, but on the contrary, is intended to cover various modifications and equivalent arrangements included within the spirit and scope of the appended claims. It will also be appreciated by those skilled in the art that the exact amount of melting point depressants needed will depend not only on the specific compositions of the base metal, the filler powder, and the braze, but also on the performance requirement of the component under repair or being joined.

The invention claimed is:
1. A nickel-based braze alloy composition comprising:
Nickel as a base to the braze alloy;
4-20% chromium by weight;

as melting point depressants a combination of 5-15% hafnium by weight, 5-25% cobalt by weight, 2-15% zirconium by weight and 3-7% titanium by weight, the melting point depressants being provided in quantities such that the braze alloy has a low melting temperature where the solidus temperature is of the order of or less than 1175° C.;

and wherein the composition is substantially boron free such that if any boron is present the composition contains no boron as a melting point depressant and any boron is present only as trace element.

2. The composition according to claim 1 comprising 7-12% hafnium by weight.

3. The composition according to claim 1 comprising 7-10% *hafnium* by *weight*.

4. The composition according to claim 1 comprising 5-15% chromium by weight.

5. The composition according to claim 1 comprising 5-10% chromium by weight.

6. The composition according to claim 1 comprising 5-7.5%:

chromium by weight.

7. The composition according to claim 1 comprising 7-20% cobalt by weight.

8. The composition according to claim 1 comprising 10-20% cobalt by weight.

9. The composition according to claim 1 comprising 5-10% zirconium by weight.

10. The composition according to claim 1 comprising 8-10% zirconium by weight.

11. The composition according to claim 1 further comprising up to 9% aluminum by weight.

12. The composition according to claim 11 further comprising 2-4% aluminum by weight.

13. The composition according to claim 1 wherein there is at least 50% of nickel and wherein the balance of the composition is one or more of molybdenum, tungsten, iron, niobium, and silicon in solid solution or as particulates.

14. A method of brazing superalloy articles comprising using as a braze alloy, in joining or narrow gap brazing to achieve required joint configurations and properties of superalloy articles, the composition according to claim 1 alone or in combination with other filler alloys.

15. The method according to claim 14 wherein the composition is used as a braze alloy.

16. The method according to claim 14 wherein the superalloy articles are gas turbine components.

17. The method according to claim 14 wherein the composition is used as a braze alloy in wide gap braze scheme to achieve identical compositions as the superalloy articles.

* * * * *